3,399,190
PHOSPHOROUS CONTAINING STARCH OXY-
ALKYLATED POLYETHERS AND THEIR
PREPARATION
Stephen Fuzesi, Hamden, and Milton Lapkin, New Haven,
Conn., assignors to Olin Mathieson Chemical Corporation, a corporation of Virginia
No Drawing. Filed May 21, 1965, Ser. No. 457,814
10 Claims. (Cl. 260—233.3)

ABSTRACT OF THE DISCLOSURE

The process of preparing phosphorus-containing starch-based polyethers by admixing starch with concentrated phosphoric acid at an elevated temperature, whereby the starch is hydrolyzed to glucose, and oxyalkylating the resulting mixture. A polyhydric alcohol may also be admixed with the hydrolized starch prior to oxyalkylation. The resulting oxyalkylated polyethers are useful in the preparation of urethane foams having flame-retardant properties.

---

This invention relates to starch-phosphorus-based polyhydroxy-polyoxyalkylene ethers and to a process for preparing them.

Polyurethane foams have been used in the preparation of structural panels, insulation, cushions, pillows, mattresses, and the like. Generally these foams are prepared by reacting an organic polyisocyanate with a polyol in the presence of a foaming agent and a catalyst. Extensive efforts have been made to reduce the cost of preparing these foams. Because of the low cost of starch, efforts have been made to employ starch as a polyol reactant in the preparation of urethane foams. The use of starch directly has been unsatisfactory because of the poor physical properties of the foam which results. Oxyalkylated starch yields satisfactory foams, but the direct oxyalkylation of starch results in degradation or decomposition of the starch and a product which is not uniform in chemical or physical properties.

A satisfactory process for utilizing starch as a component in the preparation of polyurethane foams is disclosed in U.S. Patent No. 3,277,213, issued Oct. 4, 1966, by Stephen Fuzesi. In this process starch is added to a polyhydric alcohol containing at least two hydroxyl groups in a proportion equivalent to at least 0.5 mole of the alcohol per mole of glucose unit weight of starch in the presence of an acid catalyst. The resulting reaction mixture is then oxyalkylated to yield a polyether polyol suitable for use in preparing polyurethane foams of excellent physical properties. Although a substantial proportion of the polyether polyol is based upon starch, a significant proportion of the polyether is still formed from the relatively expensive alcohol. Increasing the proportion of starch in such a polyether increases the functionality of the system and lowers the cost of the polyether. As a result, the properties of the resulting urethane foams are improved and the cost of preparing the urethane foam therefrom is reduced. An effective technique for increasing the proportion of starch in polyethers is disclosed in U.S. patent application, Ser. No. 443,098, filed Mar. 26, 1965, by Stephen Fuzesi and Leonard J. Klahs.

Although these techniques result in low-cost, starch-based polyethers, the urethane foams prepared from these polyethers do not always have desirable flame retarding properties. Although it is generally recognized that the presence of high proportions of nitrogen, phosphorus, and/or chlorine atoms enhances the flame resistance of urethane foams, present techniques for adding these components to urethane foams are not entirely satisfactory. There is a great need at the present time for low-cost polyethers capable of producing a urethane foam which is substantially flame resistant.

It is a primary object of this invention to overcome the disadvantages inherent in previously known techniques employed in the preparation of polyether polyol compounds based upon starch.

Another object of this invention is to provide an improved process for oxyalkylating a mixture of starch and phosphoric acid.

Still another object of this invention is to provide an improved polyhydroxy-polyoxyalkylene ether suitable for use in the preparation of urethane foams.

A further object of the invention is to provide an improved urethane foam.

It is another object of the invention to provide a urethane foam having flame retarding properties.

These and other objects of the invention will be apparent from the following detailed description thereof.

It has now been discovered that the objects of this invention are accomplished by admixing starch with phosphoric acid at an elevated temperature and oxyalkylating the resulting mixture to yield a starch-phosphorus-based polyether useful as a reactant in the preparation of urethane foams having satisfactory flame retarding properties. In another embodiment of the invention a polyhydric alcohol is admixed with hydrolyzed starch, and the resulting mixture, with or without prior oxyalkylation, is admixed with phosphoric acid and this mixture is then oxyalkylated to yield a starch-phosphorus-based polyether. The resulting oxyalkylated polyether is also useful as a reactant in the preparation of urethane foams having satisfactory flame retarding properties.

The starch-phosphorus-based polyether of this invention may be prepared from any starch, i.e., any compound having a formula $(C_6H_{10}O_5)_x$. These compounds are carbohydrates or polysaccharides which occur naturally in many plant cells. Typical starches which may conveniently be employed include potato starch, corn starch, chlorinated starches, rice starch, tapioca starch, wheat starch, mixtures thereof and the like. From an economic standpoint, potato starch and corn starch are preferred. The starch may be in anhydrous form or in the wet stage, for example, containing as high as about 20 percent by weight of water.

Any available phosphoric acid may be employed in preparing the polyethers of this invention. From the standpoint of economics, availability, and ease of handling, the preferred phosphoric acids include, but are not limited to, phosphoric acids containing between about 80 and about 120 percent $H_3PO_4$ by weight. Commercially available grades presently available having concentrations within this range include 85 percent phosphoric acid, 100 percent phosphoric acid, 105 percent phosphoric acid containing about 76 percent $P_2O_5$, 115 percent phosphoric acid containing about 84 percent $P_2O_5$, phosphorus anhydride containing 100 percent $P_2O_5$, and the mixtures thereof.

Any compound containing a 1,2-oxide may be conveniently employed in preparing the starch-phosphorus-based polyether of the present invention. Typical of such compounds are the alkylene oxides, especially lower alkylene oxides containing between about 2 and about 6 carbon atoms (which are preferred), aryl-alkyl oxides and cycloalkylene oxides, etc. Specific reactants include, but are not limited to, ethylene oxide, propylene oxide, butylene oxide, glycidol, isobutylene oxide, tetramethylene oxide, n-hexyl oxide, epihalohydrin, cyclobutylene oxide, cyclohexylene oxide, mixtures thereof, and the like.

No catalyst is necessary to effect the reaction between the starch, phosphoric acid, and 1,2-oxide, since the phosphoric acid reactant generally acts as a catalyst. However, if it is desired to prepare higher molecular weight polyethers with lower hydroxyl numbers, other catalytic substances may be added to the reaction mass. The acid catalyst may be any inorganic or Lewis acid catalyst. The preferred Lewis acid is boron trifluoride. Other representative Lewis acid catalysts include, but are not limited to, boron trichloride, aluminum chloride, titanium chloride, tin tetrachloride, ferric chloride, and acidic clays, such as Tonsil clay. Other suitable acid catalysts include inorganic acids such as sulfuric acid, hydrochloric acid, hydrofluoric acid, nitric acid and the like.

In one embodiment of the invention a polyhydric alcohol is added to the starch and phosphoric acid prior to the oxyalkylation. In this embodiment any polyhydric alcohol containing at least two hydroxyl groups may be employed in the preparation of starch-based polyether of this invention. It is preferred to employ glycerol, ethylene glycol, propylene glycol, sorbitol and the like due to the availability and ease of reaction. However, polyhydric alcohols which may be conveniently employed include, but are not limited to, pentaerythritol, hexanetriol, sucrose, trimethylol propane, trimethylol ethane, 1,2-butanediol, diethylene glycol, triethylene glycol, 2-butene-1,4-diol, 2-butyne-1,4-diol, 3-chloro-1,2-propanediol, 2-chloro-1,3-propanediol, mixtures thereof, and the like.

Various procedures may be employed in carrying out the process of this invention. In one embodiment of the invention starch is added to sufficient phosphoric acid to maintain the reaction mass in a fluid state under the temperature and pressure conditions employed. If desired, the starch may be added in one or more increments until all of the starch requirements have been added. The alkylene oxide is then added to the mixture of starch and phosphoric acid in a proportion to obtain the desired degree of oxyalkylation. In another embodiment a polyhydric alcohol is admixed with hydrolyzed starch, with or without prior oxyalkylation, and the resulting mixture is further admixed with phosphoric acid and then oxyalkylated. In still another embodiment, phosphoric acid is preoxyalkylated to a desired degree and then admixed with the starch to obtain the novel starch-phosphorus-based polyether of this invention.

The proportion of reactants is not critical, provided the proportion of unreacted starch in the reaction mass does not exceed the amount necessary to maintain the reaction mass in a fluid state. The proportion of phosphoric acid is generally equivalent to a $P_2O_5$ molar concentration in the range between about 1 and about 10, and preferably in the range between about 1.5 and about 3 moles of $P_2O_5$ per glucose unit weight of starch. Larger proportions of phosphoric acid may be employed, if desired. The proportion of phosphoric acid can be decreased below a molar ratio of $P_2O_5$ to glucose unit weight of starch of 0.5 to 1 when a suitable solvent is employed in carrying out the reaction.

Each glucose unit weight of starch is equivalent to 162 grams of starch on an anhydrous basis. Normally, each glucose unit weight of starch contains water associated therewith. In a preferred embodiment of the present invention, a small amount of water, preferably not more than about 2 moles or 36 grams, per glucose unit weight of starch, is added with the starch or with the phosphoric acids. However, smaller or larger proportions of water may be present if desired.

The proportion of alkylene oxide which may be added to the reactants is only limited by the amount of free acid and/or catalyst that may be present. The mixture formed by mixing starch and phosphoric acid, as described above, contains hydroxyl radicals provided by the phosphoric acid which are available to react with the alkylene oxide. In addition, hydroxyl radicals are provided by the glucose, alcohol and water if present, which are available to react with the alkylene oxide as long as there is free acid and/or catalyst present in the system. Thus, the minimum amount of alkylene oxide which will react with the mixture formed by admixing starch and phosphoric acid is approximately equivalent to 1 mole of alkylene oxide per hydroxyl radical present as phosphoric acid. However, the proportion of alkylene oxide usually added is between about 1 and about 2 moles of alkylene oxide per hydroxyl radical present in the system, including hydroxyl radicals provided by the phosphoric acid, glucose, water, starch and any other source of hydroxyl radical present in the system.

When a polyhydric alcohol is employed, the proportion is generally in the range between about 0.2 and 4 and preferably in the range between about 0.2 and about 1.0 mole of alcohol per glucose unit weight of starch.

When an additional catalyst, other than phosphoric acid, is employed, the proportion of catalyst added is at least about 0.05 percent and preferably between about 0.1 and about 2 percent of the combined weight of reactants.

The reaction between the starch, phosphoric acid and alkylene oxide, and polyol, if employed, is accelerated by employing elevated temperatures, i.e., preferably in the range between about 30° and about 120° C. Temperatures over 120° C. may be employed but decomposition occurs at temperatures higher than this during the early stages of oxyalkylation. The specific temperature of the reaction will vary depending on the degree of completion, reactants employed, time of reaction, pressure and other reaction conditions. Similarly, the reaction time will vary depending upon the temperature of the reaction, reactants employed and amounts thereof.

In a preferred procedure for carrying out the process of the present invention, a portion of the starch requirements is slowly added to the phosphoric acid at room temperature while retaining the reactants in a fluid state. An additional portion of starch is added at a temperature between about 60 and about 120° C., keeping the system constantly fluid. After the starch requirements have been added the reaction mixture may, if desired, be maintained at this elevated temperature for at least about 5 minutes and generally for not more than an hour prior to oxyalkylation. When a polyhydric alcohol is employed as a reactant, it is preferred to add the phosphoric acid to the reaction mixture of starch and alcohol.

While it is not desired to be bound by theory, it is believed that the starch will degrade in the presence of water and phosphoric acid forming glucose, and some glucose will react wtih the phosphoric acids, mainly with the polyphosphoric acids, forming glucose dihydrogen phosphates. Oxyalkylation may then be conducted with or without separating any excess water present. When the water is not removed, the water will be oxyalkylated and will produce an oxyalkylated diol as a constituent of the starch-phosphorus-based polyether. The resulting lower boiling diols may or may not be removed from the system prior to reacting with the organic isocyanate to form the polyurethane foam. Separation of the lower boiling diols depends upon the ultimate use of the starch-phosphorus-based polyether, since the presence of the lower boiling diols may be advantageous in the preparation of certain polyurethane foams.

In another embodiment of the initial step of this invention, a mixture of starch and water containing a proportion of water in excess of that necessary to hydrolyze the starch is reacted with the alkylene oxide to form in situ the corresponding glycol, thus providing all or part of the polyhydric alcohol requirements for the initial step.

After reaction of the starch, water, and phosphoric acid in the initial step has been completed and separation of the water has been or has not been made, as the case may be, oxyalkylation of the degraded starch-phosphoric acid mixture is effected by adding alkylene oxide thereto while maintaining the temperature in the range between about 30 and 120° C. The lower temperatures are preferably employed during the reaction with the alkylene oxide, since this reaction is exothermic. The period of addition of the alkylene oxide will vary with the degree of oxyalkylation desired.

When it is desired to prepare a polyether having a relatively high starch-to-phosphoric acid ratio, the starch is added to the reaction mass in two or more increments. For example, a small increment is added to the total phosphoric acid requirements followed by sufficient alkylene oxide to oxyalkylate the proportion of starch added to the reaction mass. A second increment of starch is added to the resulting reaction mass followed by the addition of a second portion of alkylene oxide. This incremental addition of starch followed by incremental addition of alkylene oxide may be repeated until the desired ratio of starch to phosphoric acid is obtained and then sufficient alkylene oxide is added to yield a starch-phosphorus-based polyether having a hydroxyl number in the desired range.

The resulting reaction product prepared by any of the aforesaid embodiments is purified by distilling off volatiles such as unreacted alkylene oxide and undesired low boiling by-products under vacuum at a suitable temperature, for example, in the range between above 60 and about 100° C. The resulting product has a pH between about 4.5 and about 5.5, and may be used to prepare urethane foams without any further treatment. However, if a polyether having a higher pH is required, an inorganic base (NaOH, KOH, CaOH, for example) or organic base (triethanolamine, triethyl amine, trimethyl amine, for example) may be employed to raise the pH to the desired level. Triethanolamine is preferably employed for this purpose. Filtration or other solid-liquid separation technique may be employed, if desired, to separate any solids that may be present, but this separation step is not necessary.

Starch-phosphorus-based polyhydroxy-polyoxyalkylene ethers prepared in accordance with this process have a relatively low viscosity and excellent physical properties which make them suitable for use in the preparation of polyurethane foams. When these starch-based polyethers are employed in the preparation of rigid polyurethane foams, the hydroxyl number of the polyether should be in the range between 300 and about 800. In the preparation of semi-rigid polyurethane foams, the hydroxyl number of the starch-based polyether should be in the range between about 100 and about 300. In the preparation of flexible polyurethane foams, the hydroxyl number of the starch-based polyether should be between about 30 and about 100.

In the preparation of polyurethane foams from the starch-phosphorus-based polyethers, either the so-called "one shot method" or the "semiprepolymer technique" ("quasiprepolymer technique") may be employed.

Any organic polyisocyanate may be employed in the preparation of the polyurethane foams, including diisocyanates, triisocyanates, and polyisocyanates. Organic polyisocyanates are preferred due to commercial availability, especially polymethylene polyisocyanates (PAPI), polymers of 2,4- and 2,6-toluenediisocyanate, and the like. Other typical exemplificative isocyanates include, but are not limited to, the following: methylene-bis-(4-phenyl isocyanate), 3,3' - bitolylene - 4,4' - diisocyanate, 3,3'dimethoxy - 4,4' - biphenylene diisocyanate, naphthalene-1,5-diisocyanate, hexamethylene diisocyanate, 1,4-phenylene diisocyanate, 2,4-toluene diisocyanate, 2,6-toluene diisocyanate, and mixtures thereof, either in their pure or crude form, the latter form usually containing polymers of the specified isocyanates. The amount of isocyanate employed in the preparation of the polyurethane foams should be sufficient to provide at least 0.7 NCO groups based on the number of hydroxyl groups present in the starch-phosphorus-based polyether of the present invention, the number of hydroxyl groups in any additive employed and the number of hydroxyl groups employed in the blowing agent. An excess of isocyanate compound may be conveniently employed; however, this is generally undesirable due to the high cost of the isocyanate compounds. It is preferable, therefore, to employ no greater than 1.25 NCO groups based on the number of hydroxyl groups and preferably between about 0.8 and about 1.15 NCO groups.

The polyurethane foams are prepared in the presence of a foaming agent and a reaction catalyst. The foaming agent employed may be any of those known to be useful for this purpose, such as water, the halogenated hydrocarbons and mixtures thereof. Typical halogenated hydrocarbons include, but are not limited to, the following: monofluorotrichloromethane, difluorodichloromethane, 1,1,2-trichloro-1,2,2-trifluoroethane, methylene chloride, chloroform, carbon tetrachloride, and mixtures thereof. The amount of blowing agent employed may be varied within a wide range. Generally, however, the halo-generally the water is employed in an amount of from to 50 parts by weight per 100 parts by weight of the starch-phosphorus-based polyether of the present invention, and generally t he water is employed in an amount of from 0.1 to 10 parts by weight per 100 parts by weight of the starch-phosphorus-based polyether of the present invention.

The polyurethane foams are prepared in the presence of a catalytic amount of a reaction catalyst. The catalyst employed may be any of the catalysts known to be useful for this purpose, including tertiary amines and metallic salts. Typical tertiary amines include, but are not limited to, the following: N-methyl morpholine, N-hydroxyethyl morpholine, triethylene diamine, triethylamine, trimethylamine and mixtures thereof. Typical metallic salts include, for example, the salts of antimony, tin and iron, e.g., dibutyltin dilaurate, stannous octoate, etc. and mixtures thereof. Generally speaking, the catalyst is employed in an amount from 0.1 to 2.0 percent by weight based on the starch-phosphorus-based polyether of the present invention.

The polyurethane foams of the present invention may be prepared directly from the reaction between the starch-phosphorus-based polyether and organic polyisocyanate in the presence of a foaming agent and reaction catalyst. Optionally, various additives may be employed in the preparation of the polyurethane foams in order to achieve particular properties. Exemplificative of such additives include, but are not limited to the following; monocarboxylic acids, polycarboxylic acids, polyesters, monohydroxy compounds, polyhydroxy compounds, etc.

Some of the starch-phosphorus-based polyethers employed in the present invention are characterized by a high room temperature viscosity. In these cases in order to prepare the polyurethane foam it will be necessary to apply heat in order to reduce the viscosity or to admix therewith a material of lower viscosity. This may be conveniently accomplished by admixing a lower viscosity starch-phosphorus-based polyether with the higher viscosity starch-phosphorus-based polyether.

It is preferred in the preparation of the polyurethane compounds of the present invention to employ minor amounts of a surfactant in order to improve the cell structure of the polyurethane foam. Typical of such surfactants are the silicone oils, and soaps. Generally up to 2 parts by weight of the surfactant is employed per 100 parts of starch-phosphorus-based polyether.

Various additives can be employed which serve to provide different properties, e.g., fillers, such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and anti-oxidants may be added.

The process of the present invention will be more readily apparent from a consideration of the following illustrative examples. In the following examples the starch which was employed contained associated therewith about 10 to 15 percent by weight of water. All parts and percentages are by weight unless indicated otherwise.

EXAMPLE 1

Into the reaction flask 116 grams of 85 percent standard grade of phosphoric acid were charged and heated to 90–95° C. 180 grams of starch containing 10 percent water were then added to the hot phosphoric acid while maintaining the temperature at 90–95° C. While the system was at a temperature in the range between 90–100° C. for on hour, the starch was hydrolyzed to lower carbohydrates, mainly to glucose. Then 300 grams of 105 percent $H_3PO_4$ were added and mixed well with the system. Propylene oxide was then added into the reaction mixture while maintaining the temperature between 70–90° C. The reaction was completed when no more propylene oxide was consumed. (After the addition of 1560 grams propylene oxide.) After one hour post reaction the volatiles were removed from the system at 80° C. and 1 mm. for 1 hour.

Analysis of polyether

| Property: | Value |
|---|---|
| Hydroxyl number | 425 |
| Acid number | 0.23 |
| pH | 5.1 |

Phosphorus, percent, 5.6.
Viscosity at 25° C., cps., 2370.

EXAMPLE 2

Into the reaction flask 58 grams of 85 percent standard grade, and 235 grams of 105 percent phosphoric acids were charged. Then 135 grams of starch were added into the mixture at room temperature and the system was heated up to 90° C. The second portion of starch (135 grams) was then added maintaining the temperature at 90° C. After a half-hour mixing period at 90–95° C., the propylene oxide addition was initiated. The reaction was completed when no more propylene oxide was consumed (1330 grams of propylene oxide were added). After one hour post reaction the volatiles were removed at 80° C. and 1 mm. for 1 hour.

Analysis of polyether

| Property: | Value |
|---|---|
| Hydroxyl number | 473 |
| Acid number | 0.2 |
| pH | 5.0 |

Phosphorus, percent, 5.0.
Viscosity at 25° C., cps. 6500.

EXAMPLE 3

The polyether prepared as in Example 2 was further propoxylated by introducing into the product $BF_3$ etherate for catalyzing the system. A proportion of 0.2 percent $BF_3$ etherate by weight of the intermediate polyether was used. After separating the volatiles from the end product at 80° C. and 1 mm. for 1 hour the analytical results were as follows.

| Property: | Value |
|---|---|
| Hydroxyl number | 402 |
| Acid number | 0.6 |
| pH | 4.5 |

Viscosity at 25° C., cps. 5680.

EXAMPLE 4

Into 230 grams of 85 percent phosphoric acid 180 grams of starch were introduced at room temperature. The system was heated to 90° C., and 200 grams of propylene oxide were added. Keeping the system at 120° C. for two hours, the starch was hydrolyzed to lower molecular weight carbohydrates, mainly to glucose. The volatiles, mainly water, were then separated from the system at 80° C. and 1 mm. for 1 hour. The propylene oxide addition was then continued at 75–85° C. until propylene oxide was no longer consumed. The total amount of propylene oxide added was 970 grams. After separation of volatiles at 80° C. and 1 mm. for 1 hour, the analytical results of the liquid polyether residue were as follows:

| Property: | Value |
|---|---|
| Hydroxyl number | 528 |
| Acid number | 0.73 |
| pH | 5.00 |

Phosphorus, percent, 5.00.
Viscosity at 25° C., cps., 8240.

EXAMPLE 5

Into 173 grams of 85 percent phosphoric acid, 180 grams of starch were added at 80–90° C. After addition of starch the system was kept at 80–90° C. for one hour. A mixture of 55 grams of $P_2O_5$ and 94 grams of 105 percent phosphoric acid was then added at 100–105° C. The system was exothermic and was cooled by a water bath. Propylene oxide was then added into the homogeneous mixture at 60–85° C. until no more propylene oxide was consumed. The amount of propylene oxide added was 1320 grams. After separation of volatiles at 80° C. and 1 mm. for 1 hour, the analytical results were as follows.

| Property: | Value |
|---|---|
| Hydroxyl number | 437 |
| Acid number | 0.13 |
| pH | 5.0 |

Viscosity at 25° C., cps., 4160.

EXAMPLE 6

To a nitrogen purged kettle were charged successively 3.17 parts of 85 percent phosphoric acid and 13.1 parts of 105 percent phosphoric acid. The mixture of acids was heated to 50° C. and about 7.55 parts of corn starch containing about 10 percent water were admixed with the acid. The resulting mixture was heated to 90° C. and an additional 7.55 parts of corn starch were added to the mixture while maintaining a nitrogen purge in the kettle. The reactor temperature was maintained at 90° C. for about one-half hour, after which time the temperature was increased to 105° C. Propylene oxide was added while maintaining the temperature in the range between about 100–110° C. Approximately seven hours were required to add 74.2 parts of propylene oxide. The reactants were retained in the reactor, with agitation, at the same temperature for about one hour after all of the propylene oxide had been added.

At the end of this period the reaction product was stripped under vacuum at a temperature of about 85–95° C. to remove unreacted propylene oxide and volatile by-products. The liquid residue was then filtered through a polishing filter at a temperature of about 80–85° C. Analyses of the resulting polyether were as follows.

| Property: | Value |
|---|---|
| Hydroxyl number | 473 |

Volatiles, percent, 0.4.
Water, percent, 0.07.

| Acid number | 0.24 |
|---|---|
| pH | 5.8 |

Peroxides, percent, 0.
Viscosity at 24° C., cps., 2800.

| Suspended matter | None |
|---|---|

EXAMPLE 7

To 100 grams of product of Example 2 were added 2 grams of tetramethylbutanediamine catalyst, 2 grams of silicone oil and 34 grams of trifluorochlormethane and the mixture was stirred until homogeneous. Then 121 grams of polymethylene-polyphenyl-isocyanate (PAPI) were added. The resultant mixture was stirred for about 19 seconds, poured into a mold, allowed to cure at room temperature to a rigid polyurethane foam having a fine cell structure and a density of 2.0 pounds per cubic foot.

Property: Value
    Compressive strength, p.s.i. _____ 31.4
    Porosity, percent closed cells _____ 86.0
    K factor _____ 0.133
    Cell size, mm.$^2$ _____ 2.3
    Burning property _____ Non-burning [1]
    Humid aging, percent change in volume:
      (a) 7 days, 158° F., 100% humidity ___ 13.8
      (b) Low temperature, 7 days, −20° F. _ −0.6
      (c) Dry heat, 7 days, 158° F. _____ 1.0

[1] As determined by ASTM 1692-D59T.

EXAMPLE 8

A rigid polyurethane foam was prepared in a manner after Example 7 from the following ingredients:

| | Grams |
|---|---|
| Product of Example 4 | 100 |
| Tetramethylbutanediamine | 2 |
| Silicone oil | 2 |
| Trifluorochloromethane | 37 |
| Polymethylene-polyphenyl-isocyanate (PAPI) | 134 |

The resultant rigid polyurethane foam had a fine cell structure and a density of 1.9 pounds per cubic foot. Other properties were as follows.

Property: Value
    Compressive strength, p.s.i. _____ 31.3
    Porosity, percent closed cells _____ 87.0
    K factor _____ 0.131
    Cell size, mm.$^2$ _____ 2.1
    Burning property _____ Non-burning
    Humid aging, percent change in volume:
      (a) 7 days, 158° F., 100% humidity ___ 13.7
      (b) Low temperature, 7 days, −20° F. _ −1.0
      (c) Dry heat, 7 days, 158° F. _____ 2.7

EXAMPLE 9

Into a reaction vessel 184 grams of glycerol and 3 cc. $BF_3$ etherate were charged, and the temperature gradually brought to 130° C. At this time 360 grams of starch containing 10 percent water were added into the hot glycerol-$BF_3$ mixture. The temperature was maintained at 130° C. until the iodine test indicated that no starch was present (absence of blue color using a $KI-I_2$ water solution for testing). When the starch test was negative 350 grams of 100 percent phosphoric acid were introduced into the system and the water was separated at 80° C. and 1 mm. vacuum. Propylene oxide was then added. The reation was completed when propylene oxide absorption ceased. About 50 percent of the propylene oxide was added at 105° C., 25 percent at 90° C., and 25 percent at 80° C. The volatiles were then separated at 140° C. and 1 mm. for 2 hours.

Analysis of polyether

Property: Value
    Hydroxyl number _____ 425
    Acid number _____ 0.8
    pH _____ 4.0
    Phosphorus, percent, 5.4.
    Viscosity at 25° C., cps., 17,000.

EXAMPLE 10

Into the reaction vessel 92 grams of glycerol and 4 cc. $BF_3$ etherate were charged and heated to 130° C. Then 360 grams of starch were introduced into the system. The temperature was maintained at 130° C. until the iodine test indicated that no starch was present. Then 120 grams of propylene oxide were added at 115–125° C. After addition of propylene oxide, 3 cc. of $BF_3$ etherate were charged into the system, and the temperature was increased to 130° C. Added into the system were 360 grams of starch, and the temperature was maintained at 130° C. until the iodine test indicated that all the starch was hydrolyzed. Propylene oxide (180 grams) was then added at 115–125° C. When all the propylene oxide was used up by the system, 3 cc. $BF_3$ etherate were added at 115° C. and 360 grams of starch were added at 130° C. Sufficient propylene oxide was then added to yield a propoxylated product having a hydroxyl number of 500. Six hundred grams of this prepropoxylated product and 294 grams of $H_3PO_4$ (100 percent) were charged into a reaction vessel and were propoxylated to the desired product. This starch-glycerol-phosphoric acid based polyether gave the following analytical results:

Property: Value
    Hydroxyl number _____ 343
    Acid number _____ 0.11
    pH _____ 5.0
    Phosphorus, percent, 4.9.
    Viscosity at 25° C., cps. 6000.

EXAMPLE 11

This polyether was prepared by the procedure of Example 9, except 105 percent phosphoric acid was used instead of 100 percent acid.

Analysis of polyether

Property: Value
    Hydroxyl number _____ 410
    Acid number _____ 1.6
    pH _____ 7.2
    Phosphorus, percent, 5.0.

EXAMPLE 12

This polyether was prepared by the procedure of Example 10, except that HCl was used as catalyst instead of $BF_3$ etherate, the starch glycerol molar ratio was 4:1 instead of 6:1 and 105 percent phosphoric acid was used instead of 100 percent. Analytical results were as follows:

Property: Value
    Hydroxyl number _____ 428
    Acid number _____ 0.96
    pH _____ 7.1
    Phosphorus, percent, 5.5.
    Viscosity at 25° C., cps. 6000.

EXAMPLE 13

This polyether was prepared by the procedure of Example 2, except that ethylene oxide was used instead of propylene oxide as the oxyalkylating agent.

Analysis of polyether

Property: Value
    Hydroxyl number _____ 429
    Acid number _____ 0.9
    pH _____ 4.7
    Phosphorus, percent, 4.5.

EXAMPLE 14

Into a reaction vessel 460 grams of glycerol and 12.5 cc. $BF_3$ etherate were charged and heated to 130° C. Then 900 grams of starch were introduced into the hot liquid and kept at 125–140° C. for one hour. Then 2500 grams of propylene oxide were added. After one hour post reaction, the volatiles were separated at 150° C. and 1 mm. for 3 hours. The product had a hydroxyl number of 526 and an acid number of 0.05. Six hundred and sixty grams of this polyether were mixed at room temperature with 330 grams of $H_3PO_4$ (100 percent and propoxylated until no more propylene oxide was consumed. After separation of the volatiles, the product had the following properties:

Property: Value
    Hydroxyl number _____ 400
    Acid number _____ 0.03
    Phosphorus, percent, 4.55.

EXAMPLE 15

To 100 grams of the product of Example 9 were added 1.5 grams of silicone oil, 3.0 grams of tetramethylbutanediamine catalyst and 28 grams of trifluorochloromethane and the mixture was stirred until homogeneous. Then 107 grams of polymethylene-polyphenyl-isocyanate (PAPI) were added. The resultant mixture was stirred for about 17 seconds, poured into a mold and allowed to cure at room temperature to a rigid polyurethane foam having a fine cell structure, a density of 2.0 pounds per cubic foot, with good strength and good dimensional stability.

EXAMPLE 16

A rigid polyurethane foam was prepared in a manner after Example 14 from the following ingredients:

|  | Grams |
|---|---|
| Product of Example 14 | 100 |
| Trifluorochloromethane | 30 |
| Silicone oil | 1.5 |
| Tetramethylbutanediamine | 2.0 |
| Polymethylene-polyphenyl-isocyanate (PAPI) | 101.0 |

The resultant rigid polyurethane foam had a fine cell structure, a density of 2.1 pounds per cubic foot, a compressive strength of 27.9 p.s.i. and a K factor of 0.120. The foam had non-burning properties.

Various modifications of the invention, some of which have been referred to above, may be employed without departing from the spirit of the invention.

What is desired to be secured by Letters Patent is:

1. The process for preparing a starch-phosphorus-based polyether which comprises admixing starch with phosphoric acid containing between about 80 and about 120 percent by weight of $H_3PO_4$ in a proportion equivalent to between about one and about ten moles of $P_2O_5$ equivalents in said phosphoric acid per glucose unit weight of starch, at a temperature in the range between about 30 and about 120° C., reacting the resulting mixture with an alkylene oxide, the proportion of alkylene oxide being equivalent to between about one and about two moles of alkylene oxide per mole of hydroxyl radicals present in said mixture and recovering the starch-phosphorus-based polyether produced thereby.

2. The process of claim 1 wherein said starch is selected from the group consisting of potato starch, corn starch and mixtures thereof, and said alkylene oxide is selected from the group consisting of propylene oxide, ethylene oxide and mixtures thereof.

3. The composition produced by the process of claim 2.

4. The process for preparing a starch-phosphorus-based polyether which comprises admixing starch with phosphoric acid containing between about 80 and about 120 percent by weight of $H_3PO_4$ in a proportion equivalent to between about one and about ten moles of $P_2O_5$ equivalents in said phosphoric acid per glucose unit weight of starch, at a temperature in the range between about 30 and about 120° C., reacting the resulting mixture with an alkylene oxide, the proportion of alkylene oxide being equivalent to between about one and about two moles of alkylene oxide per mole of hydroxyl radicals present in said mixture, adding to the resulting oxyalkylated mixture a catalytic proportion of an acid catalyst and an additional proportion of alkylene oxide in a proportion equivalent to between about one and about two moles of alkylene oxide per mole of hydroxyl radicals present in said oxyalkylated mixture, and recovering the starch-phosphorus-based polyether produced thereby.

5. The process of claim 4 wherein a polyhydric alcohol is admixed with said starch and said phosphoric acid prior to reacting with said alkylene oxide.

6. The process of claim 5 wherein said polyhydric alcohol is selected from the group consisting of glycerol, propylene glycol, ethylene glycol, and mixtures thereof.

7. The composition produced by the process of claim 6.

8. The process for preparing a starch-phosphorus-based polyether which comprises admixing a phosphoric acid having an $H_3PO_4$ concentration in excess of 100 percent with a sufficient proportion of a phosphoric acid having an $H_3PO_4$ concentration of less than 100 percent to yield a phosphoric acid mixture having an $H_3PO_4$ concentration of about 100 percent, admixing with the resulting acid mixture about 1.5 glucose unit weight of starch per mole of $H_3PO_4$ initially present in said acid mixture at a temperature in the range between about 30 and about 70° C., heating the resulting mixture of phosphoric acid and starch to a temperature in the range between about 80 and about 100° C., admixing the resulting mixture with an additional portion of about 1.5 glucose unit weight of starch per mole of $H_3PO_4$ initially present in said acid mixture while maintaining the temperature thereof in the range between about 80 and about 100° C. for between about 20 and about 60 minutes, then increasing the temperature to between about 100 and about 110° C., adding to the heated reaction mass formed by mixing said starch portions with said phosphoric acid portions an alkylene oxide equivalent to between about one and about two moles of alkylene oxide per mole of hydroxyl radicals present in said heated reaction mass during a period of between about five and about eight hours, retaining the resulting reaction mass at the latter temperature for an additional period of between about 30 and about 120 minutes after completion of addition of said alkylene oxide, stripping volatile materials from the resulting oxyalkylated reaction mass, and recovering a starch-phosphorus-based polyether from the resulting liquid residue.

9. The process of claim 8 wherein said starch is selected from the group consisting of potato starch, corn starch and mixtures thereof, and said alkylene oxide is selected from the group consisting of propylene oxide, ethylene oxide, and mixtures thereof.

10. The composition produced by the process of claim 8.

References Cited

UNITED STATES PATENTS

| 3,165,608 | 1/1965 | Otey et al. | 260—2.5 |
| 3,218,272 | 11/1965 | Nowlin et al. | 260—2.5 |
| 3,251,828 | 5/1966 | Lutz | 260—2.5 |

DONALD E. CZAJA, *Primary Examiner.*

R. W. MULCAHY, *Assistant Examiner.*